US012559998B2

(12) United States Patent
Perrin et al.

(10) Patent No.: US 12,559,998 B2

(45) Date of Patent: Feb. 24, 2026

(54) DECLUTCHING SYSTEM FOR A HANDLE ARRANGEMENT

(71) Applicant: U-shin Italia S.p.A, Pianezza (IT)

(72) Inventors: Christophe Perrin, Nevers (FR); Thomas Lanno, Nevers (FR)

(73) Assignee: U-shin Italia S.p.A, Pianezza (IT)

( * ) Notice: Subject to any disclaimer, the term of this patent is extended or adjusted under 35 U.S.C. 154(b) by 178 days.

(21) Appl. No.: 18/188,746

(22) Filed: Mar. 23, 2023

(65) Prior Publication Data

US 2023/0304331 A1 Sep. 28, 2023

(30) Foreign Application Priority Data

Mar. 23, 2022 (EP) .................................... 22163916

(51) Int. Cl.

*E05B 81/90* (2014.01)
*E05B 81/76* (2014.01)
*E05B 85/10* (2014.01)

(52) U.S. Cl.

CPC .............. *E05B 81/90* (2013.01); *E05B 81/76* (2013.01); *E05B 85/10* (2013.01)

(58) Field of Classification Search

CPC .......... E05B 81/90; E05B 81/76; E05B 81/46; E05B 85/10; E05B 15/0053;

(Continued)

(56) References Cited

U.S. PATENT DOCUMENTS 1,852,552 A * 4/1932 Altorfer .................. F16D 43/18 192/105 CD
4,311,331 A * 1/1982 Lutz ........................ E05B 81/25 292/201

(Continued)

FOREIGN PATENT DOCUMENTS

DE 4215374 A1 * 11/1992 ............. E05B 81/25
DE 19858414 A1 * 6/2000 ............. E05B 77/06

(Continued)

OTHER PUBLICATIONS

European Search Report issued Sep. 23, 2022 in European Application 22163916.4 filed on Mar. 23, 2022, 5 pages.

*Primary Examiner* — Steven A Tullia

(74) *Attorney, Agent, or Firm* — Oblon, McClelland, Maier & Neustadt, L.L.P.

(57) ABSTRACT

A declutching system for a handle arrangement of a motor vehicle includes: an axle whereon are arranged a housing and a declutching member. The declutching system presents a clutch position wherein the declutching member blocks the housing in rotation around the axle by cooperating with a cam of the housing, and a declutch position wherein the declutching member allows the housing to rotate around the axle. The declutching member includes a pivotable arranged lever and an elastic member, the lever provided with a head at its free end cooperating with the elastic member. In the clutch position, the head of the lever cooperates with the cam of the housing to prevent the housing from rotating about the axle and is maintained in position by the elastic member. In the declutch position, the head of the lever compresses the elastic member enabling rotationally displacement of the housing around the axle.

11 Claims, 4 Drawing Sheets

(58) Field of Classification Search
CPC .... E05B 15/004; E05B 17/046; E05B 17/045; E05B 17/044; E05B 2047/0026; E05B 2047/0027; E05B 2047/003; E05B 2047/0086; E05B 2047/0084; E05B 63/0069; Y10T 292/57
See application file for complete search history.

(56) References Cited

U.S. PATENT DOCUMENTS

| | | | | | |
|---|---|---|---|---|---|
| 4,850,466 | A * | 7/1989 | Rogakos | F16D 43/18 | 192/76 |
| 4,966,266 | A * | 10/1990 | Yamada | F16D 43/02 | 292/201 |
| 5,946,955 | A * | 9/1999 | Suggs | E05B 47/068 | 70/218 |
| 6,343,760 | B1 * | 2/2002 | Smithson | B60R 22/38 | 242/383.2 |
| 8,408,612 | B2 * | 4/2013 | Jankowski | E05B 77/06 | 292/216 |
| 9,574,381 | B2 * | 2/2017 | Beck | E05B 85/14 | |
| 10,954,702 | B2 * | 3/2021 | Couto Maquieira | E05B 81/16 | |
| 11,187,008 | B2 * | 11/2021 | Kwon | E05B 13/005 | |
| 11,708,706 | B2 * | 7/2023 | Min | G07C 9/00571 | 70/279.1 |
| 2003/0014835 | A1 * | 1/2003 | Dimig | E05B 85/16 | 16/110.1 |
| 2005/0133337 | A1 * | 6/2005 | AbuSamra | F16D 43/12 | 192/114 R |
| 2012/0267905 | A1 * | 10/2012 | Debroucke | E05B 85/10 | 292/336.3 |
| 2019/0055761 | A1 * | 2/2019 | Yoshino | E05B 85/16 | |

FOREIGN PATENT DOCUMENTS

| | | | | |
|---|---|---|---|---|
| DE | 10 2014 117 005 | A1 | 5/2016 | |
| DE | 102016212511 | A1 * | 2/2017 | E05B 85/10 |
| DE | 102016104095 | A1 * | 9/2017 | E05B 77/12 |
| DE | 10 2019 200 851 | A1 | 7/2020 | |
| DE | 10 2020 112 935 | A1 | 11/2021 | |
| EP | 0153234 | B1 * | 9/1988 | E05B 81/25 |
| EP | 1113130 | A1 * | 7/2001 | E05B 47/068 |
| EP | 3556972 | A1 * | 10/2019 | E05B 1/003 |
| JP | 7000736 | B2 * | 1/2022 | E05B 79/06 |
| WO | WO-2019002472 | A1 * | 1/2019 | E05B 81/90 |

* cited by examiner

DECLUTCHING SYSTEM FOR A HANDLE ARRANGEMENT

BACKGROUND OF THE INVENTION

Field of the Invention

The invention relates to a declutching system for a handle arrangement of a motor vehicle, in particular in the case of automated door latches that are controlled via electric means.

Description of the Related Art

Automated door latches selectively lock or release vehicle door panels in an automated fashion. By automated door latches are herein designated door latches provided with a manually operable handle element and a rotatably mounted transmission lever which is connected to the handle element and can be rotated by actuating the handle element to such an extent that it activates a switch for opening the door latch.

Once the door panel is released, the user or an electric panel actuator swings or slides the panel to grant physical access to the vehicle.

However, in such electrical system, problems arise when the doors cannot be electrically opened anymore, particularly in case of a crash accident or because of an empty vehicle battery.

Document DE102014117005 tries to solve this problem by proposing a handle arrangement wherein a rotatably transmission lever is connected to a handle element which is blocked into rotation by a declutching system when the handle element is actuated under a predetermined force threshold. Hence, when the user actuates the handle element below the predetermined force threshold, he actuates the electrical opening system of the handle arrangement. When the user actuates the handle element above the predetermined force threshold, he declutches the mechanical opening system of the handle arrangement.

However, the declutching system disclosed in this document is large and difficult to adapt on the bracket of a handle arrangement.

BRIEF SUMMARY OF THE INVENTION

The invention intends to obviate at least partly this lack in the art.

The object of the invention is to provide a compact declutching system for a handle arrangement of a motor vehicle.

To that end, the invention relates to a declutching system for a handle arrangement of a motor vehicle comprising an axle whereon are arranged a housing and a declutching member, the declutching system presenting two positions, a clutch position wherein the declutching member blocks the housing in rotation around the axle by cooperating with a cam of the housing and a declutch position wherein the declutching member allows the housing to rotate around the axle, wherein the declutching member comprises a pivotable arranged lever and an elastic member, the lever being provided with a head at its free end cooperating with the elastic member, wherein in the clutch position of the declutching system, the head of the lever cooperates with the cam of the housing so as to prevent the housing from rotating about the axle and is maintained in position by the elastic member, and wherein in the declutch position of the declutching system, the head of the lever compresses the elastic member enabling the rotationally displacement of the housing around the axle.

The declutching system of the invention takes the advantage to clutch and to declutch the rotation of the housing around the axle with a compact system which do not request the translation of a member along the axle. The force required to deform the elastic member is the torque of magnitude which has to be applied on the housing for its rational displacement around the axle.

In operation, the declutching system moves from the clutched position to the declutched position when a torque of a magnitude above a predetermined threshold is applied on the housing. Accordingly, under normal circumstances, i.e., when the electrical panel actuator is operable, the declutching system is in its clutch position such that when the handles is actuated by a user with a torque of magnitude below the predetermined threshold, it will put into rotation a rotatably transmission lever until the latter be stopped into rotation by the declutching system. Interestingly, the clutch position of the declutching system of the invention gives a haptic sensation to the user informing him he enough extends the handle to trigger the electrical panel actuator and grant physical access to the vehicle.

Under abnormal circumstances, when the electrical panel actuator is not operable, for example in case of a crash or an empty vehicle battery, actuating the handle with a pulling force below the predetermined threshold will not trigger the electrical panel actuator. However, actuating the handle with a pulling force above the predetermined threshold will allow the housing to deform the elastic member of the declutching member and to be put into rotation around the axle. In that situation, the rotatably transmission lever will continue its rotation and the handle will be extended with a higher aperture angle. The rotation of the transmission lever triggers a backup mechanical panel actuator allowing the panel to be opened.

When the user stops actuate the handle, the housing is drove back by the rotatably transmission lever and the declutching system returns to its clutch position. The elastic member returns from an active deformed shape to a passive shape blocking the housing in rotation.

The declutching member presents two configurations corresponding to the two positions of the declutching system. Firstly, the declutching member has a block configuration wherein the head of the lever cooperates with the cam of the housing and blocks the latter into rotation around the axle. Secondly, the declutching member has a release configuration wherein the elastic member is deformed, and the head of the lever cooperates with an adjacent surface to the cam of the housing enabling the rotationally displacement of the housing around the axle. The declutching member passively moves from the release configuration to the block position because of the reversible shape property of the elastic member.

The declutching member switches from the block configuration to the release configuration by the application of a load force by the cam of the housing onto the at head of the lever, pushing the latter in the direction of the elastic member and resulting in the deformation of the elastic member by compression in an opposite direction to the head of the lever.

With preference, the elastic element is a spring or a reversible deformable pad.

Notably, the housing comprising an inner wall, the cam of the housing is arranged in the inner wall of the housing.

With preference, the cam of the housing is a groove disposed along the axle. Preferably, the groove has a U-shape cross section. In that aspect of the invention, the head of the lever can comprise a protrusion extending away from the elastic member and cooperating with the cam of the housing.

With preference, the housing has a peripherical rib for actuating in rotation around the axle.

Notably, the head of the lever is provided with a curbed portion overlaying the elastic element. The curbed portion allows to stop the movement of the lever when the latter is pushed by the housing and avoids supercharging the elastic member.

With preference, the declutching member is disposed in a barrel of the axle.

The invention also relates to a handle arrangement for a door lock comprising a declutching system as defined above.

BRIEF DESCRIPTION OF THE SEVERAL VIEWS OF THE DRAWINGS

The invention will be better understood in view of the following description, referring to the annexed figures in which:

FIGS. 4*a* and 4*b* represent two views of the declutching system of FIG. 1 in the clutch position, wherein FIG. 4*a* is a side view and FIG. 4*b* is a sectional view.

FIGS. 5*a* and 5*b* represent two views of the declutching system of FIG. 1 in the declutch position, wherein FIG. 5*a* is a side view and FIG. 5*b* is a sectional view.

DETAILED DESCRIPTION OF THE INVENTION

The following achievements are examples. Although the specification refers to one or several embodiments, it does not imply that each reference refers to the same embodiment or that the features apply only to a single embodiment. Simple features of different embodiments can also be combined to provide other embodiments.

Figure 1:
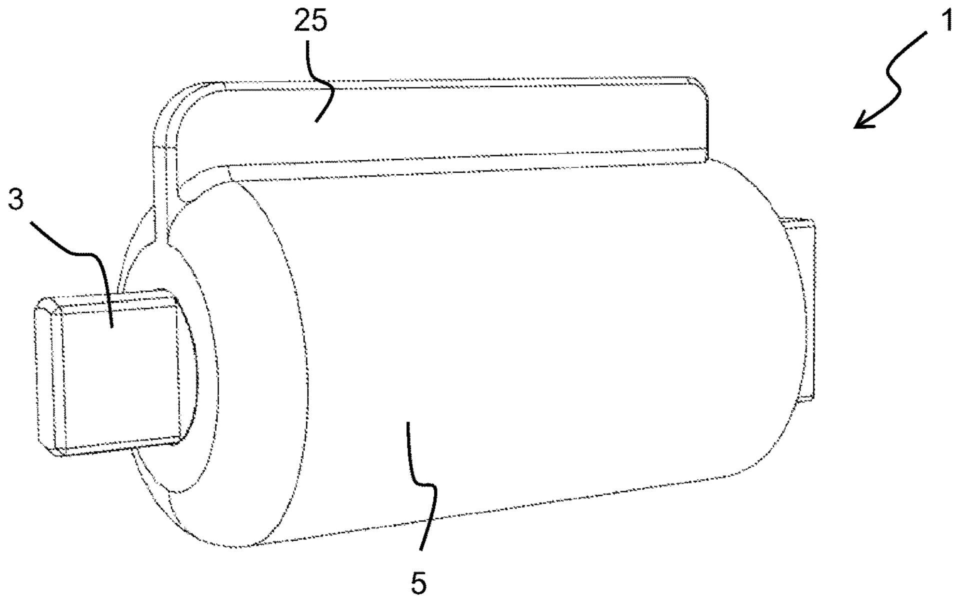
FIG. 1 is a perspective view of the declutching system according to the invention.
Figure 2:
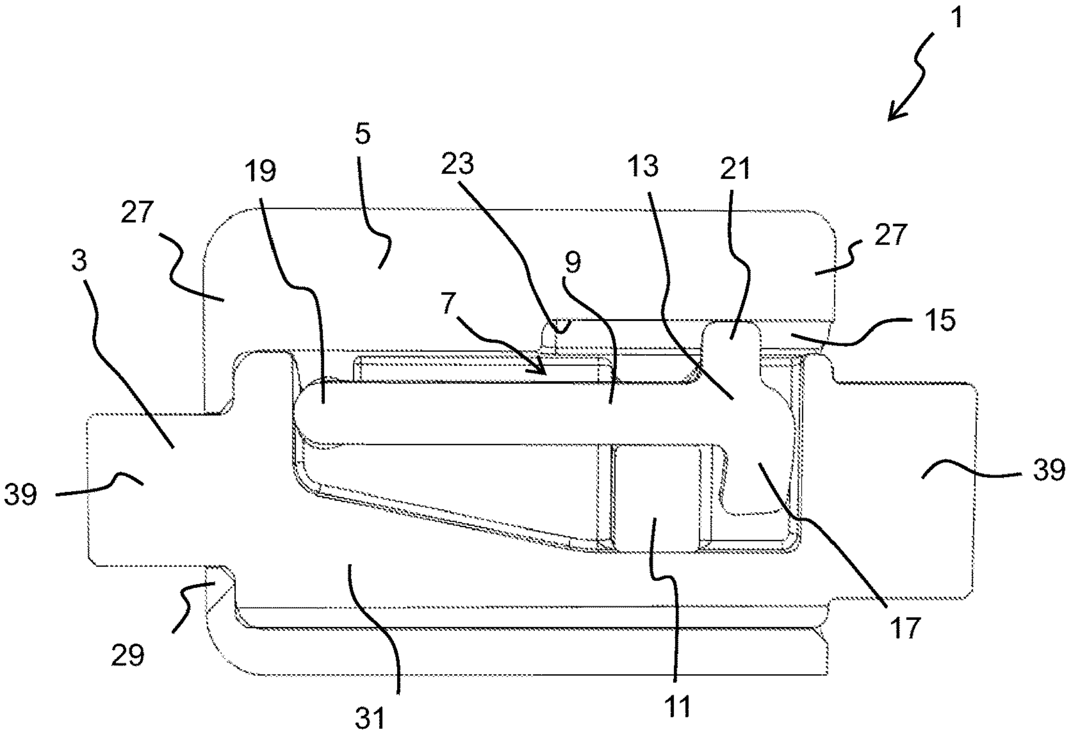
FIG. 2 is a sectional view of the sectional view of the declutching system of FIG. 1.
Figure 3:
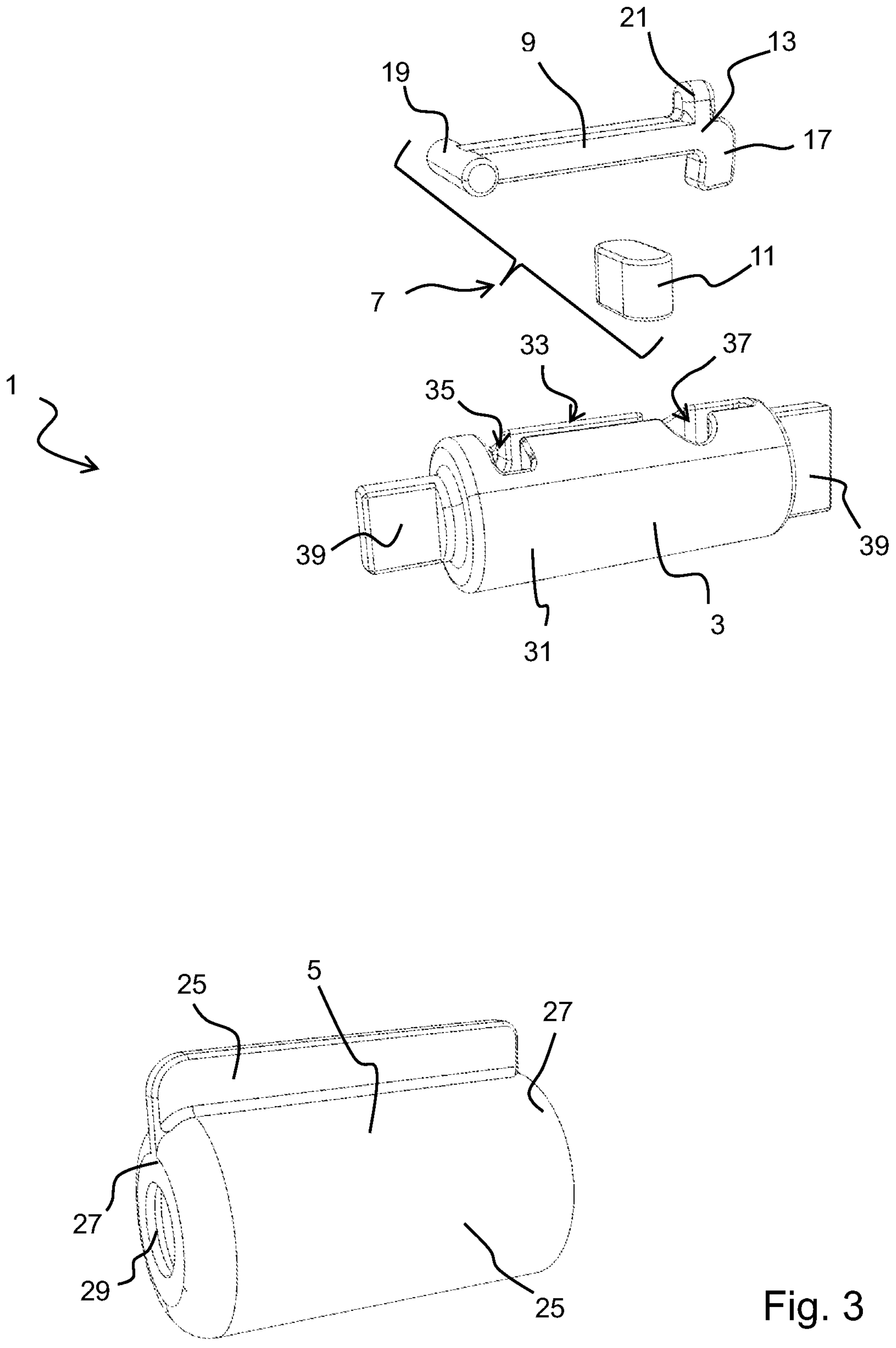
FIG. 3 is an explode view of the declutching system of FIG. 1.
Figure 6:
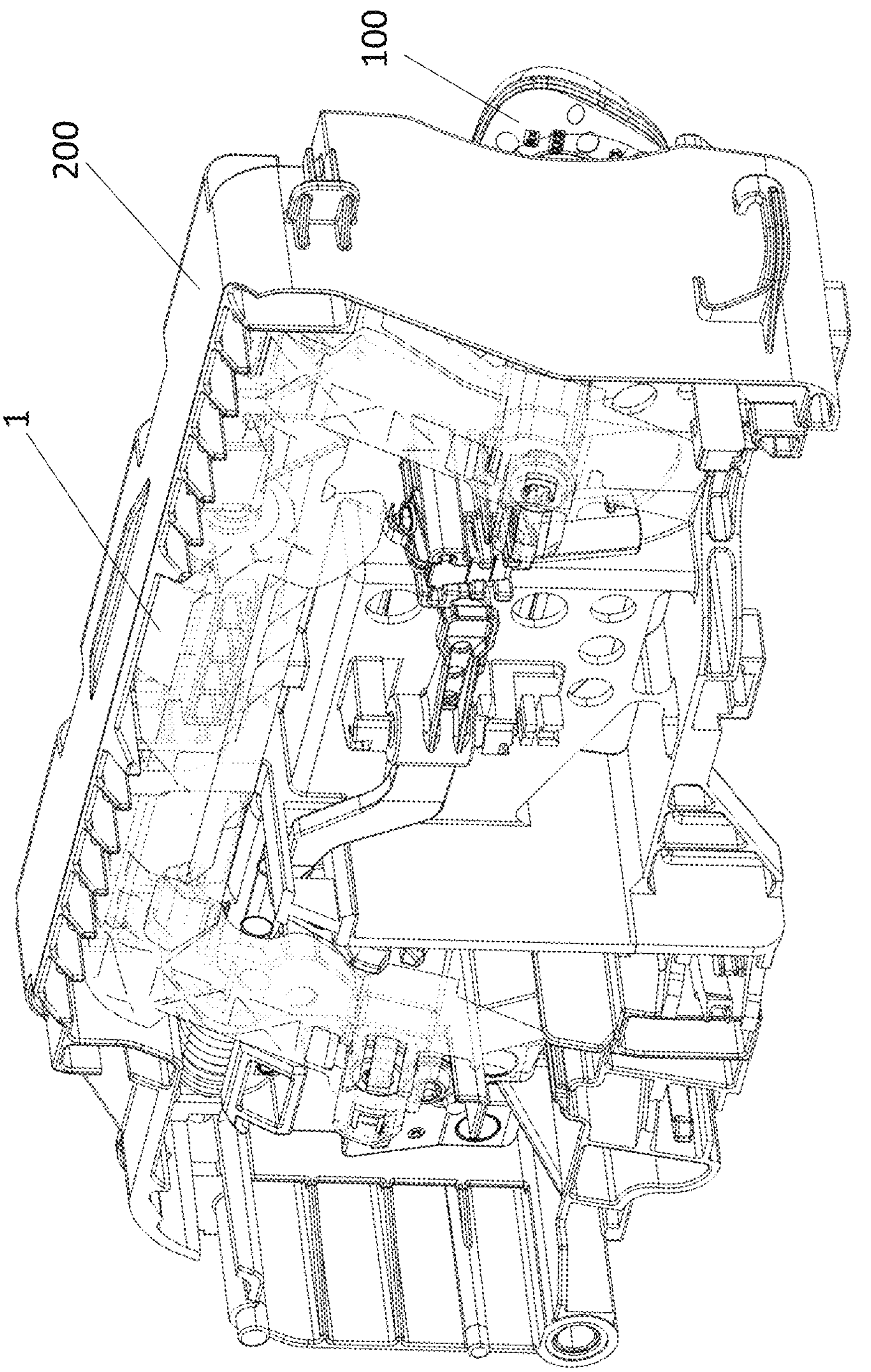
FIG. 6 is a view of the declutching system of FIG. 1 in a vehicle handle.

FIGS. 1 to 3 represent different views of a declutching system 1 according to the invention and will be read together. FIG. 6 is a view of the declutching system 1 in a vehicle handle.

The declutching system 1 of the invention is part of a vehicle handle (not shown) 100 and comprises an axle 3 whereon are arranged a housing 5 and a declutching member 7. The declutching system 1 presents two positions, a clutch position (as represented in FIGS. 1, 2 and 4) and a declutch position (represented in FIG. 5). The rotation of the housing 5 around the axle 3 is blocked or allowed by the declutching member 7. When a torque of magnitude above a particular threshold is applied by the housing 5 on the declutching member 7, the declutching system 1 moves from the clutch position toward the declutch position and the housing 5 pivots around the axle 3. The housing 5 is arranged on the axle 3 in a rotationally displaceable manner and the declutching member 7 is arranged on the axle 3 in a rotationally and axially fixed manner. Accordingly, the declutching member 7 does not move around or along the axle 3. The housing 5 overlays the declutching member 7.

The declutching member 7 comprises a pivotable arranged lever 9 and an elastic member 11. The elastic member 11 can be a compression spring or a reversible deformable pad. The lever 9 is provided with a head 13 at its free end cooperating on one side with the elastic member 11 and on the other side with a cam 15 of the housing 5. In the clutch position of the declutching system 1, the elastic member 11 maintains the head 13 of the lever 9 in contact with the cam 15 of the housing (as represented in FIGS. 2 and 4*b*).

When the housing 5 is put into rotation, the cam 15 applies a load force on the lever 9. When said load force is below the mechanical resistance of the elastic member 11, the lever 9 cannot compress it and the declutching system 1 remains in the clutch position. When the load force of the cam 5 is higher than the mechanical resistance of the elastic member 11, the lever 9 compresses the elastic member 11 and the declutching system 1 moves from the clutch position to the declutch position allowing the housing 5 to continue its rotational movement around the axle 3.

The head 13 of the lever 9 can be provided with a curbed portion 17 at its extremity for limiting the pivoting movement of the lever 9 and avoiding the lever 9 to supercharge the elastic member 11. Accordingly, the curbed portion 17 overlays the elastic member 11.

The lever 9 has a base part 19 configured to pivot. In one embodiment of the invention, the base part 19 is a hinged pin as represented on FIG. 3. The pivoting movement of the lever can be performed in any direction regarding the axle, and in particular along the axle or in a direction perpendicular to it.

In one embodiment of the invention, the head 13 of the lever 9 comprise a protrusion 21, extending away from the elastic member 11 and/or from the curbed portion 17, cooperating with the cam 15 of the housing 5.

In one embodiment of the invention, the cam 15 is arranged on the inner wall 23 of the housing 5. The cam 15 can be a groove disposed along the axle 3, as represented on FIG. 2. The said groove 15 can have a U-shape cross section or a V-shape cross section. The groove can end on one edge of the housing. This aspect of the invention facilitates the assembly of the declutching system, in which the housing is slipped around the axle and the protrusion of the head of the lever slides in the groove of the housing. Alternatively, the cam can have a dome shape.

As presented, the housing 5 can be crossing. Notably, the housing 5 has a cylindrical hollow body 25 shape with two opened extremities 27. The body 25 of the housing 5 cooperates with the axle 3. One of the opened extremities 27 can have a dome shape with a through hole 29 at its apex cooperating with the axle 3 for limiting the translational movement of the housing along the axle 3.

The housing 5 can be provided with a rib 25 a peripherical rib for actuating in rotation around the axle. With preference, the rib 25 is disposed along the axle.

In one embodiment of the invention, the axle 3 comprises a barrel 31 extending along its direction and wherein is arranged the declutching member 7. As represented, the declutching member 7 is then in a slot 33 arranged in the barrel 31. This aspect of the invention enhances the compact property. More specifically, the lever 9 and the elastic member 11 are in two respective slots (35, 37). As represented on FIG. 2, the barrel 31 of the axle cooperates with one of the extremities 27 of the housing 5 to limit the translational displacement of the housing 5 along the axle 3.

As shown, the housing overlays the declutching member 7 and the axle 3 excepted for the extremities 39 of the latter so it can be fixed on a bracket 200 of the handle arrangement. In the represented embodiment, the axle 3 is provided with rectangular shaped extremities 39 designed to cooperate with the bracket in a fixed manner. Said shape of the extremities 39 avoids the axle 3 to pivot around them.

The description will now detail FIGS. 4*a* to 5*b* which represent different views of the clutch and declutch positions of the declutching system 1.

Figure 4A:
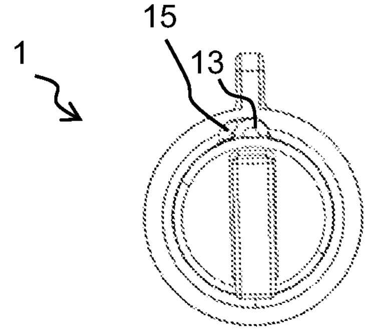
Figure 4B:
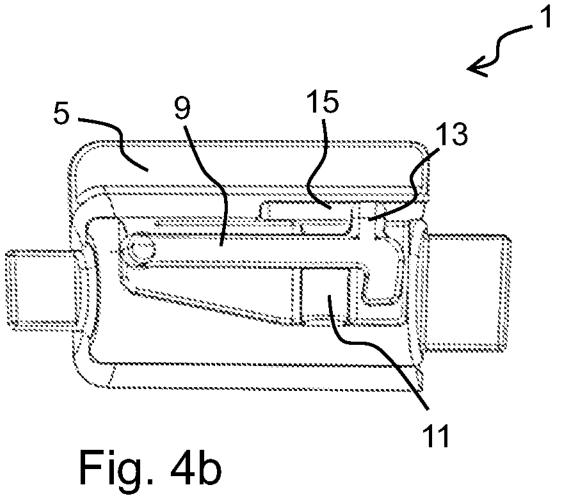

FIGS. 4*a* and 4*b* are read together and show the clutch position of the declutching system 1. The head 13 of the lever 9 is here in contact with the cam 15 of the housing 5. More precisely, the protrusion of the head is in contact with the wall of the groove 15. A torque of magnitude is applied on the rib of the housing 5, but with a force below the mechanical resistance of the elastic member 11. Consequently, the head 13 of the lever 9 is not pushed by the wall of the groove 15, and the lever 9 does not pivot.

Figure 5A:
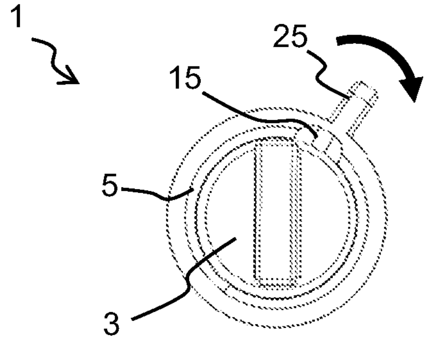
Figure 5B:
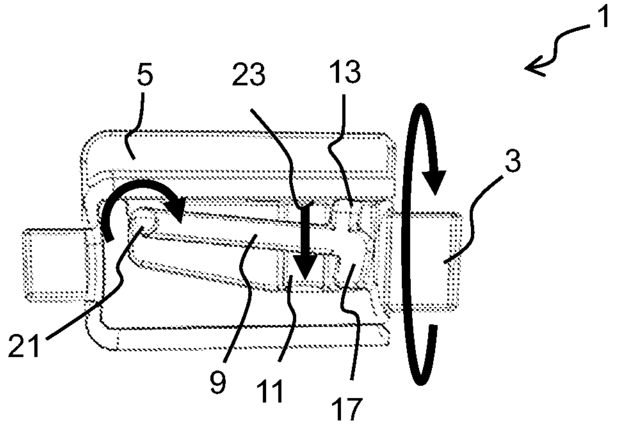

FIGS. 5*a* and 5*b* are read together and show the declutch position of the declutching system 1. The rib 25 of the housing has been actuated with a magnitude of force above the mechanical resistance of the elastic member. The head 13 of the lever 9 is not anymore in contact with the cam 15 of the housing 5. Indeed, the wall of the groove 15 pushed down the head 13 of the lever 9 resulting in the pivoting of the base 19 of the lever 9 rotated around the hinged pin. The groove 15 is now empty while the head 13 cooperates with a surface of the inner wall 23 of the housing 5 adjacent to the groove 15. Accordingly, the housing 5 is free to rotate around the axle 3. The head 13 of the lever 9 is maintained pushed down by the said surface of the inner wall 23 of the housing 5. The elastic member 11 is compressed by the head 13 of the lever 9 and the curbed portion 17 of the head 13 of the lever 9 contacts the bottom of the lever's slot, stopping the rotation of the lever 9.

The invention claimed is:

1. A declutching system for a handle arrangement of a motor vehicle comprising:

an axle whereon are arranged a housing and a declutching member which is overlaid by the housing, the declutching system presenting two positions, a clutch position wherein the declutching member blocks the housing in rotation around the axle by cooperating with a cam of the housing and a declutch position wherein the declutching member allows the housing to rotate around the axle, wherein the declutching member comprises a pivotable arranged lever and an elastic member, the lever being provided with a head at a first end cooperating with the elastic member, the first end of the lever being free, wherein in the clutch position of the declutching system, the head of the lever cooperates with the cam of the housing so as to prevent the housing from rotating about the axle and is maintained in position by the elastic member, wherein in the declutch position of the declutching system, the head of the lever compresses the elastic member enabling the rotationally displacement of the housing around the axle, and wherein the axle includes a barrel including a first slot and a second slot, the lever is disposed in the first slot, and the elastic member is disposed in a second slot, and the barrel cooperates with an opened extremity of the housing to limit translational displacement of the housing along the axle.

2. The declutching system according to claim 1, wherein the elastic element is a compression spring or a reversible deformable pad.

3. The declutching system according to claim 1, the housing comprising an inner wall, wherein the cam of the housing is arranged in the inner wall of the housing.

4. The declutching system according to claim 3, wherein the cam of the housing is a groove disposed along the axle, the groove having a U-shape cross section.

5. The declutching system according to claim 4, wherein the head of the lever comprises a protrusion extending away from the elastic member and cooperating with the cam of the housing.

6. The declutching system according to claim 1, wherein the housing has a peripherical rib for actuating in rotation around the axle.

7. The declutching system according to claim 6, wherein a length of the peripheral rib is greater than a length of the lever.

8. The declutching system according to claim 1, wherein the head of the lever is provided with a curbed portion overlaying the elastic element.

9. A handle arrangement for a door lock comprising a declutching system according to claim 1.

10. The declutching system according to claim 1, wherein a second end of the lever includes a base part configured to pivot, the base part of the lever does not pivot when the declutching system is in the clutch position, and the base part of the lever pivots when the declutching system is in the declutch position.

11. The declutching system according to claim 1, wherein the axle includes rectangular shaped extremities configured to cooperate with a bracket in a fixed manner.

* * * * *